March 21, 1950 F. W. KUPPERSMITH 2,501,130
GAUGE FOR CHECKING EXTERNAL DIMENSIONS OF CIRCULAR WORK
Filed March 31, 1945 4 Sheets-Sheet 1
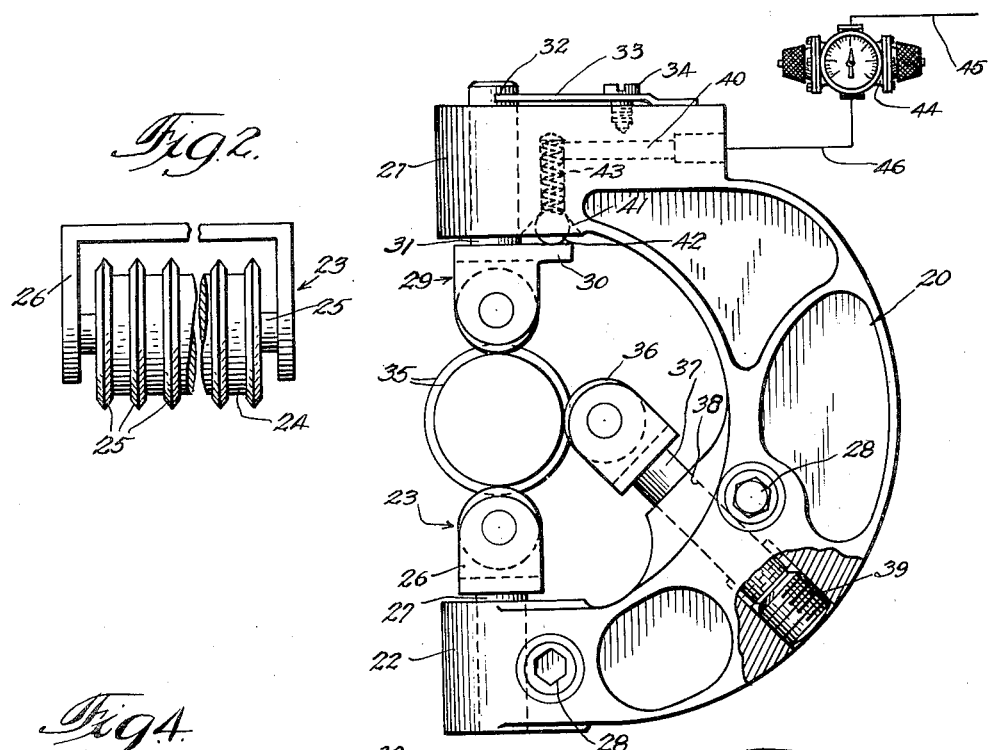
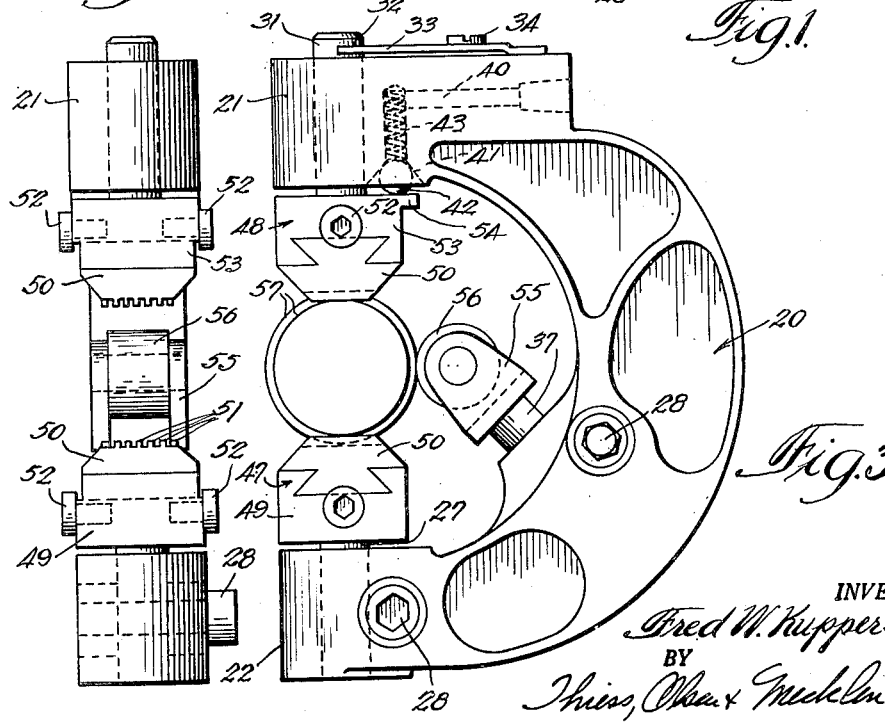
INVENTOR.
Fred W. Kuppersmith
BY
Thiess, Olan & Mecklenburger
Attys.

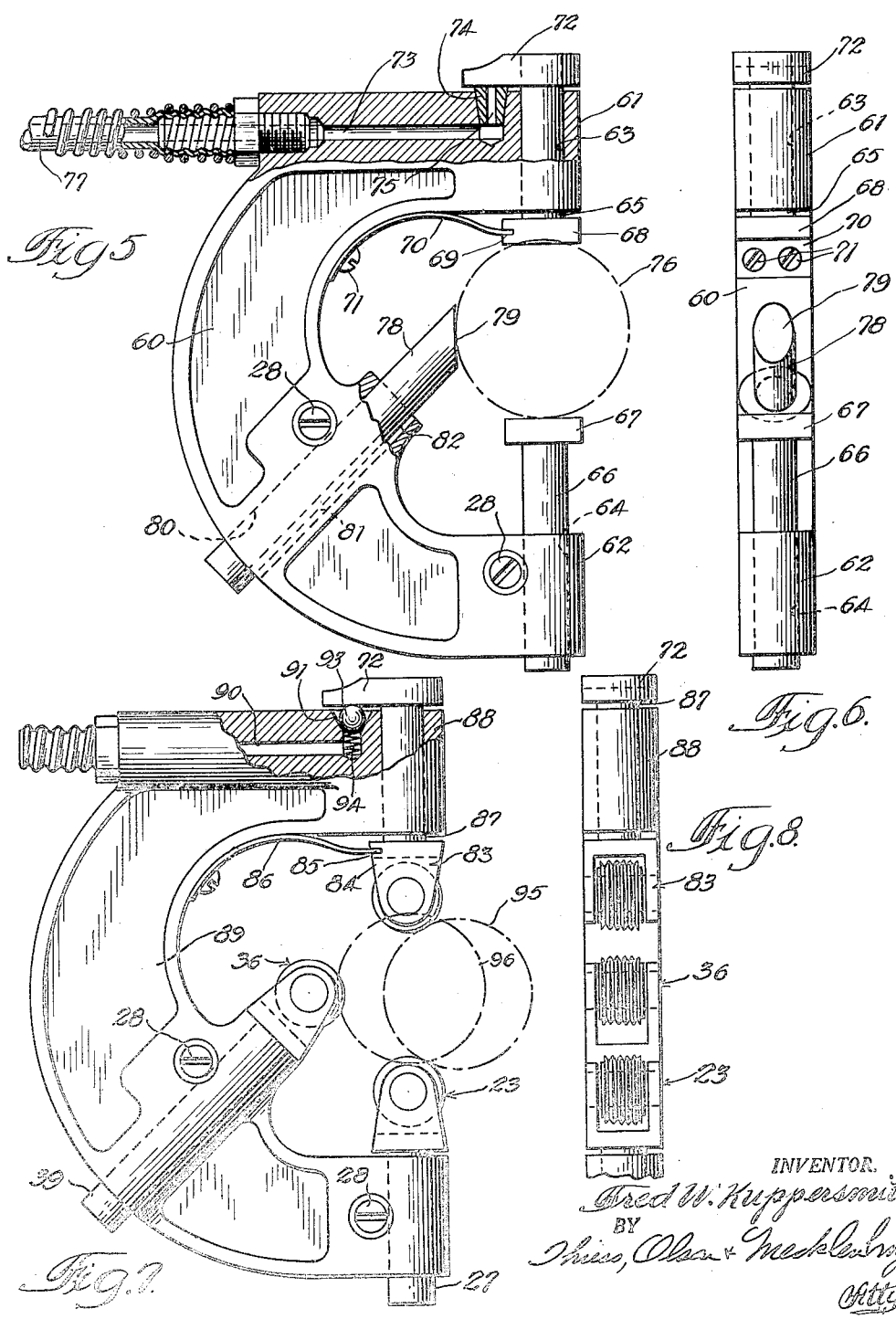

March 21, 1950  F. W. KUPPERSMITH  2,501,130
GAUGE FOR CHECKING EXTERNAL
DIMENSIONS OF CIRCULAR WORK Filed March 31, 1945  4 Sheets-Sheet 3

INVENTOR.
Fred W. Kuppersmith
BY
Thiess, Olsen & Mecklenburger
Attys.

INVENTOR.
Fred W. Kuppersmith
BY
Thiess, Olsen & Mecklenburger
Attys.

Patented Mar. 21, 1950

2,501,130

UNITED STATES PATENT OFFICE 2,501,130

GAUGE FOR CHECKING EXTERNAL DIMENSIONS OF CIRCULAR WORK

Fred W. Kuppersmith, Bloomington, Ill.

Application March 31, 1945, Serial No. 585,869

2 Claims. (Cl. 33—178)

This invention relates to check gauges, more particularly to pneumatically-operated check gauges or comparators for readily and accurately comparing with a standard, or measuring, threaded parts or substantially cylindrical unthreaded parts, and the invention has for an object the provision of improved gauges of this character.

In a prior application, Serial No. 467,438, filed November 30, 1942, and issued as Patent Number 2,397,494, in the name of the present applicant and entitled Measuring device, various types of pneumatically-operated measuring devices and gauges, together with an improved pressure regulator and indicator, are shown and described. Although certain of the basic principles disclosed in this prior application are employed in gauges embodying the present invention, the improved gauges herein disclosed are particularly adapted for the accurate measuring or comparing of cylindrical and threaded workpieces, and are of such simple and sturdy construction as to render them useful under various conditions and by relatively unskilled operators.

In carrying out the invention in one form, a gauge is provided comprising a pair of spaced apart oppositely disposed work-engaging elements, together with means for adjusting the spacing of the elements in order that workpieces of different diameters may be inserted therebetween, one of the elements being resiliently mounted for limited movement by a workpiece upon insertion of the workpiece between the elements. The gauge is provided with a fluid passageway having an outlet opening, and fluid under pressure is supplied to the passageway at a point remote from the outlet opening. Associated with the movable work-engaging element are means for variably restricting the outlet opening to vary the back pressure in the passageway, and indicating means responsive to the back pressure in the passageway are utilized to indicate the size of the workpiece being checked. Preferably the outlet from the passageway is in the form of an outwardly diverging substantially conical seat, and a ball is disposed in the seat for movement with respect thereto so as variably to restrict the outlet and thereby vary the back pressure in the passageway, the position of the ball being controlled by the movable work-engaging element.

In order properly to position workpieces within the gauge for checking, a backing member is provided for limiting the extent of insertion of the workpiece between the work-engaging elements, the backing member being mounted rearwardly of the work-engaging element so as to position the workpiece with the elements engaging it in diametric relation, and means are provided for adjusting the position of the backing member in conformance with adjusted spacings of the work-engaging elements so that workpieces of different diameter, when inserted between the work-engaging element, will be engaged by the backing member on a radius substantially at right angles to the diameter engaged by the checking elements.

For a more complete understanding of the invention, reference should now be had to the drawings in which:

Fig. 1 is a side elevational view partly in section of a thread gauge embodying the present invention;

Fig. 2 is a detail view of one of the work-engaging elements employed in the gauge of Fig. 1;

Fig. 3 is a side elevational view similar to Fig. 1 of another form of thread gauge embodying the invention;

Fig. 4 is a front elevational view of the gauge shown in Fig. 3;

Fig. 5 is a side elevational view partly in section of another gauge embodying the invention and adapted for the checking of unthreaded cylindrical parts;

Fig. 6 is a front elevational view of the gauge shown in Fig. 5;

Fig. 7 is an elevational view partly in section of still another form of thread gauge embodying the invention;

Fig. 8 is a fragmentary front elevational view of the gauge shown in Fig. 7;

Figures 9, 10, 11:
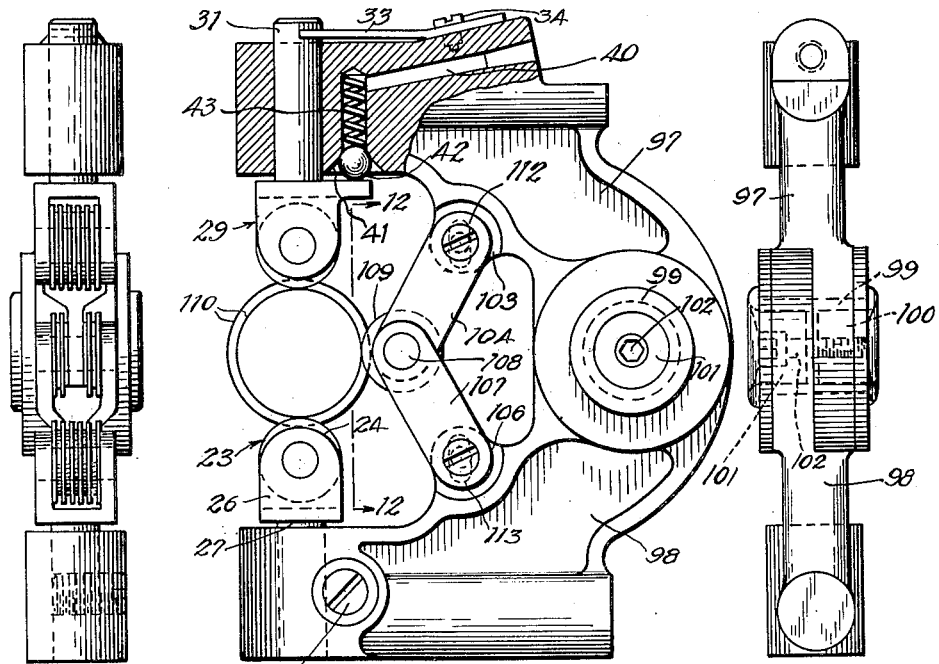
Fig. 9 is a side elevational view partly in section of still another form of thread gauge embodying the invention.
Fig. 10 is a back elevational view of the gauge shown in Fig. 9.
Fig. 11 is a front elevational view of the gauge shown in Fig. 9.
Figures 12, 13:
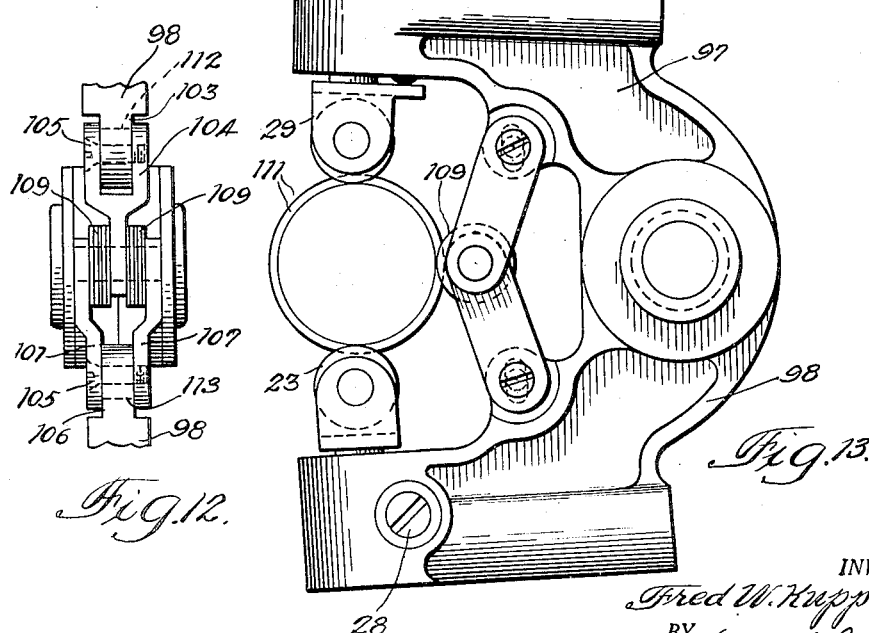
Fig. 12 is a fragmentary elevational view taken substantially along the line 12—12 of Fig. 9.
Fig. 13 is an elevational view similar to Fig. 9 but showing the gauge adjusted for the checking of workpieces of larger diameter.

Referring now to Fig. 1 of the drawings, the invention is shown as embodied in a thread gauge for checking or comparing threaded parts, which gauge comprises a generally C-shaped frame 20 having upper and lower legs 21 and 22, respectively. Carried by the lower leg 22 is a work-engaging roller or element 23 which is constructed as shown more in detail in Fig. 2. The thread engaging element 23 is of a type well known in the art consisting of a roller or cylinder 24 having a plurality of substantially V-shaped annular ridges 25 extending from the surface of the roller, the size and spacing of the ridges being such that when brought into contact with a threaded part of the correct pitch these ridges will engage the thread substantially at the pitch line. The roller 24 is mounted on a shaft 25 which shaft is carried by a substantially U-shaped frame 26, the mounting of the roller on the shaft and the mounting of the shaft in the frame being somewhat loose to permit the roller 24 to adjust itself to the angularity of the threads on the part being checked.

As shown in Fig. 1, the frame 26 of the thread-engaging element 23 is mounted on a pin 27 which is slidably adjustable in a drilled hole in the end of the leg 22 of the frame 20. Suitable locking means are provided for securing the pin 27 in various adjusted positions relative to the leg 22, and although various types of locking means may be provided, the means 28 shown in Fig. 1 are preferably of the general type illustrated in Fig. 15 which will be more fully described hereinafter.

Mounted in the upper leg 21 of the frame 20 for limited movement with respect thereto, is a thread-engaging element 29 which is identical with the thread-engaging element 23 except that the roller supporting frame is provided with a rearwardly-extending lug or tail 30. The pin 31 on which the thread-engaging element 29 is mounted extends entirely through a suitable aperture in the leg 21 and at its upper end is provided with a notch 32 for receiving the end of a leaf spring 33 which is suitably secured to the upper surface of the leg 21 as by a screw 34, the spring 33 being arranged to urge the pin 31 downwardly to a position in which the free end of the spring engages the upper surface of the arm 21. In the drawings the pin 31 and the thread-engaging element 29 are shown in their uppermost position to which they have been moved by insertion of a threaded workpiece between the opposed work-engaging elements 23 and 29, the workpiece being diagrammatically indicated in the drawing by the concentric circles 35.

Also carried by the frame 20 is a third work-engaging element which constitutes a backing member 36 and which may be identical with the work-engaging element 23. The backing member 36 is carried by a pin 37 arranged for axial adjustment in an angularly extending bore 38 in the frame 20. Adjacent its outer end the bore 38 is enlarged, as shown, and threaded to receive an adjusting screw 39, having a predetermined number of threads per inch for moving the backing member 36 to various adjusted positions, the inner face of the screw 39 being adapted to abut the end of the pin 37. Suitable locking means 28 are also associated with the pin 37 to secure the backing member 36 in any desired position after adjustment thereto by the adjusting screw 39.

The backing member 36 is employed, as shown in Fig. 1, to limit the extent to which the workpiece 35 may be inserted between the elements 23 and 29. The bore 38 and the supporting pin 37 for the backing member extend at an angle of 45 degrees with respect to a line drawn through the centers of the work-engaging elements 23 and 29, and consequently adjustment of the pin 37 in the bore 38 will cause the backing member 36 to move equal distances in horizontal and vertical directions. By reason of this 45 degree angularity the backing member 36 may readily be adjusted to a position in which it will engage the workpiece on a radius substantially at right angles to the diameter of the workpiece engaged by the elements 23 and 29, while insuring that the extent of insertion of the workpiece is such that the elements 23 and 29 engage the workpiece in diametric relation. Thus, if it is desired to adjust the spacing of the elements 23 and 29 so as to check a threaded workpiece having a pitch diameter 1/8 inch smaller than the workpiece 35, it is necessary only to adjust the work-engaging element 23 upwardly 1/8 inch and to adjust the backing member 36 upwardly and inwardly a distance such that it will have moved inwardly 1/16 inch and upwardly 1/16 inch, whereupon it will be positioned to engage the smaller workpiece on a radius at right angles to the diameter engaged by the elements 23 and 29.

Extending through a portion of the upper leg 21 of the frame 20 is a passageway 40 that terminates in an outlet which, as shown, comprises a conical seat 41 in a lower surface of the leg 21. Disposed in the conical seat for engagement by the arm or tail 30 on the element 29 is a valve or ball 42 which is normally biased downwardly by a spring 43, and it will be observed that upward and downward movement of the element 29 when engaged by a work piece will cause movement of the ball 42 toward and away from the conical seat 41 so as to vary the degree of restriction of the outlet by the ball. The other end of the passageway 40 is connected in any suitable manner to a source of fluid under substantially constant pressure, and a suitable pressure gauge is connected to the passageway to indicate variations in the back pressure produced by the movement of the ball 42.

Although any suitable pressure source and pressure indicator may be employed, Fig. 1 diagrammatically shows a combined pressure regulator and indicating instrument 44 of the type described and claimed in the above referred to prior application Serial No. 467,438. This pressure regulator and indicating instrument is connected, as diagrammatically indicated by the line 45 in Fig. 1, to a suitable source of air pressure and is likewise connected, as indicated by the line 46 in Fig. 1, to the passageway 40. The regulator supplies to the passageway 40 a substantially constant volume of fluid under substantially constant pressure, and consequently movement of the ball 42 to vary the degree of restriction of the outlet to the passageway 40 causes a variation in the back pressure which is indicated on the dial of the measuring instrument.

In Fig. 1 the taper of the conical seat 41 is shown as approximately 30 degrees with respect to the axis of the passageway, but other angles may be employed depending upon the sensitivity of response desired in the instrument 44. It will be apparent that as the angle of taper increases, i. e., the conical seat 41 approaches a flat seat, the change in the degree of closure or opening provided by a predetermined movement of the ball 42 will increase, and therefore the change in the back pressure provided by a predetermined movement of the ball will likewise increase. Accordingly, it is necessary to correlate the calibrations of the pressure-responsive instrument 44 with the taper of the conical seat 41 to obtain the desired response.

The embodiment of the invention illustrated in Figs. 3 and 4 is in general similar to the gauge of Fig. 1, and the same reference numerals are employed to indicated the same or corresponding parts. The gauge of Figs. 3 and 4 is adapted for use in checking threaded parts having either square or V-shaped threads, and in place of the work-engaging elements 23 and 29 of Fig. 1, the supporting pins 31 and 27 carry anvil type work-engaging elements 47 and 48. As shown, the work-engaging element 47 consists of a supporting block 49 carried on the pin 27 and having a dovetail groove in the upper surfaces thereof in which groove there is disposed the thread-engaging anvil 50, the upper surface of which is provided with a plurality of properly shaped parallel ridges 51. In order that the anvil 50 may be removed and replaced by a similar anvil having different shaped or different size thread-engaging ridges thereon, a pair of locking screws 52 is provided which threadedly engage the block 47 with a portion of the head of each screw extending over the end of the dovetail portion of the anvil 50 to retain the anvil in the dovetail groove while permitting a slight longitudinal movement thereof in order that the anvil 50 may properly engage the threads of the part being tested.

The work-engaging element 48 consists of a supporting block 53 which is in general similar to the block 49 but which is provided with a lug or tailpiece 54 for engaging the spring pressed ball 42. Likewise the work-engaging element 48 includes a thread-engaging anvil 50 and suitable locking screws 52 which are identical with the corresponding parts of the work-engaging element 47. The backing member in this embodiment of the invention includes a U-shaped frame 55 which is mounted on the adjustable pin 37 and supports a smooth surfaced cylindrical roller 56.

In Fig. 3 a workpiece is diagrammatically shown by the concentric circles 57, and it will be observed that the work-engaging element 48 has been moved by the workpiece 57 to its uppermost position so that the ball 42 substantially closes the passageway 40, the cylinder 56 of the backing member engaging the surface of the workpiece 57 so as to position it with the work-engaging elements 47 and 48 in diametric relation to the workpiece. Upon removal of the workpiece the work-engaging element 48 will be forced downwardly by the spring 33 and the spring 43 will cause the ball to move downwardly so as to open the outlet from the passageway 40. It will of course be understood that in this embodiment of the invention, as well as in all of the succeeding embodiments to be described hereinafter, the passageway 40 is connected to a suitable source of pressure and a suitable pressure-responsive instrument, as described in connection with the embodiment shown in Fig. 1.

The check gauge shown in Figs. 5 and 6 is adapted for use in checking unthreaded cylindrical parts or similar parts having a circular contour, and comprises a C-shaped frame 60 which is in general similar to the frame 20 of the previous embodiments and includes opposed legs 61 and 62 having aligned drilled holes 63 and 64 therein for slidably receiving suitable pins 65 and 66, respectively. The pin 66 carries on its upper end a work-engaging anvil 67, and suitable locking means 28 are employed for locking the pin 66 in predetermined adjusted positions. The pin 65 in the upper leg 61 carries at its lower end a work-engaging anvil 68 having a slot 69 therein for receiving the free end of a leaf spring 70, the opposite end of which is connected to frame 60 by screws 71, the spring 70 normally biasing the pin 65 and the anvil 68 to the lowermost position shown in Fig. 5.

At its extending upper end the pin 65 carries an arm 72 which, upon movement of the pin 65 relative to the arm 61, moves toward and away from the outlet of a fluid passageway 73 formed in the frame 60. Preferably the outlet of the passageway 73 is formed by an insert or seat 74 having an opening 75 therethrough of restricted diameter. When the pin 65 and the anvil 68 are in the lowermost positions shown in Fig. 5, it will be observed that the arm 72 substantially closes the outlet 75 from the passageway 73 and it will be apparent that if a workpiece such as indicated diagrammatically by the circle 76 is forced between the spaced apart work-engaging elements 67 and 68, the element 68 will be moved upwardly so as to open the outlet 75 and cause a drop in the back pressure in the chamber 73 which, as previously indicated, is connected by a pipe or tube 77 to a suitable pressure-responsive instrument and a suitable source of pressure.

In this embodiment of the invention the backing member comprises an adjustable pin 78 having a beveled end 79 for engaging the workpiece 76, the pin 78 being mounted in a drilled hole 80 in the frame 60, which hole extends at an angle of 45 degrees to the center lines of the work-engaging elements 67 and 68. The backing member 78 is adjustable along the hole 80 and is provided with suitable locking means 28 as in the previously described embodiments, and in order to insure that the beveled face 79 will always occupy a vertical position, the hole 80 in the frame 60 is provided with a keyway or slot 81 for receiving a key 82 carried by the backing member 78.

The embodiment of the invention shown in Figs. 7 and 8 is in some respects similar to the embodiment of Fig. 1 and employs a number of identical parts which are indicated by the same reference numerals as were employed in Fig. 1. In place of the upper work-engaging element 29 of Fig. 1, however, the gauge shown in Figs. 7 and 8 includes a work-engaging element 83 having a frame 84 provided with a slot 85 for receiving the free end of a leaf spring 86 which is substantially identical with the spring 70 of Figs. 5 and 6. This work-engaging element 83 is mounted on a pin 87 carried by the upper arm 88 of a generally C-shaped frame 89, and the upper end of the pin 87 carries an arm which is identical with the arm 72 of the embodiment shown in Fig. 5. The upper leg 88 of the frame 89 includes a fluid passageway 90 which terminates in a conical seat or outlet 91 in which is disposed a ball or valve 93 biased in an upward direction by a coil spring 94.

In Fig. 7 the work-engaging element 83 is shown in its lowermost position to which it is urged by the spring 86, and the ball 93 substantially closes the outlet of the fluid passageway 90. If the workpiece to be checked is inserted between the work-engaging elements 23 and 83 to a position in which it engages the backing member 36, it will be observed that as the workpiece is moved from the position indicated by the broken line circle 95 to the position indicated by the similar circle 96, the work-engaging element 83 will be forced upwardly and the spring 94 will move the ball 93 outwardly in the conical seat so as to effect a drop in the back pressure in the passageway 90.

In Figs. 9 to 13, inclusive, a thread gauge is shown which is adapted for a somewhat greater range of adjustment than the previously described gauges. In this embodiment of the invention, the generally C-shaped frame comprises a pair of frame members 97 and 98 which are pivotally connected together, as shown best in Fig. 10, so that the opposite ends of the members 97 and 98, which form the upper and lower ends of the C-shaped frame, may be adjusted toward and away from each other. In order to provide the pivotal connection and likewise provide means for locking the frame members in various adjusted positions, the frame members 97 and 98 are provided with aligned apertures for receiving a hollow spinning or tube 99, the ends of which are flanged outwardly to retain the frame members in assembled relation. Disposed within the tubular member 99 is a pair of locking members or blocks 100 and 101, the block 101 being drilled and countersunk as shown to receive a screw 102, and the block 100 being threaded so as to be threadedly engaged by the screw 102. Each of the blocks 100 and 101 is slightly tapered as shown, and it will be apparent that when the screw 102 is tightened to draw the locking blocks 100 and 101 toward each other, a wedging action will be obtained which will expand the tubular member or spinning 99 into tight engagement with the frame members 97 and 98 to lock them against pivotal movement. If desired, the tubular member 99 may be provided with an inner tapered surface and the locking blocks 100 and 101 may either be correspondingly tapered or substantially cylindrical so that a similar wedging action will be obtained by a tightening of the screw 102.

As will be apparent upon inspection of Fig. 9, this embodiment of the invention employs the same work-engaging elements 23 and 29 as the embodiment shown in Fig. 1 and similar parts have been identified with similar reference numerals. In this embodiment of the invention, however, a somewhat different arrangement of the backing member is provided. As shown, the frame member 97 is provided with an extending ear 103 adapted to be straddled by the bifurcated end of a link 104 (Fig. 12), one side of the bifurcation being threaded to receive a suitable screw 105 which extends through the other side of the bifurcation and through a suitable aperture in the ear 103 to provide a pivotal mounting for the link 104. Similarly, the frame member 98 is provided with an ear 106 adapted to be straddled by the corresponding ends of a pair of links 107, one of the links 107, as shown best in Fig. 12, being threaded to receive another screw 105 which passes through the other link 107 and a suitable aperture in the ear 106 to provide a pivotal mounting for the links 107.

The free ends of the links 104 and 107 are apertured to receive a shaft or pin 108 which serves pivotally to connect the links together, and which likewise forms a support for a pair of thread-engaging rollers 109 which form the backing member for the gauge. The rollers 109 are preferably provided with V-shaped ridges similar to the ridges 25 on the roller 24 of Fig. 2. It will be apparent that when the frame members 97 and 98 are adjusted to vary the spacing between the work-engaging elements 23 and 29, the links 104 and 107 will pivot about the screws 105 so as to move the backing rolls 109 toward or away from the work-engaging elements 23 and 29. In Fig. 9 a threaded workpiece of predetermined diameter is indicated by the concentric circles 110 and in Fig. 13 the gauge is shown after adjustment so as to receive a threaded workpiece of larger diameter indicated diagrammatically by the concentric circles 111.

Due to the fact that the pivot pins or screws 105 for the links 104 and 107 move on a different radius than the work-engaging elements 23 and 29, when the frame members 97 and 98 are pivotally adjusted with respect to each other, the inward and outward movement of the backing rolls 109 will, within a limited range of adjustment, automatically correspond to the spacing of the work-engaging elements 23 and 29 so as properly to position the workpieces of different diameters between these elements. Outside of this limited range of adjustment, however, proper positioning of the backing rolls 109 would not be obtained, and accordingly the ears 103 and 106 are provided with elongate slots 112 and 113, respectively through which the pivot pins or screws 105 extend. Thus, after the spacing of the work-engaging elements 23 and 29 has been adjusted, the screws 105 may be loosened and the angular position of the links may be adjusted by moving the screws 105 along the slots 112 and 113 until the backing rolls 109 are properly positioned. Tightening of the screws 105 draws the bifurcated portions of the link 104 and the ends of the two links 107 together so as to clamp the links 104 and 107 in the desired position. This clamping action may in some cases be sufficient to retain the frame members 97 and 98 in their respective adjusted positions, in which case the locking means formed by the blocks 100 and 101 and the locking screw 102 may be omitted at the pivotal connection of the frame members 97 and 98. It will be observed that the work-engaging element 23 is adjustable with respect to the frame member 98, and minor adjustments of the spacing between the work-engaging elements may be accomplished without varying the relative positions of the frame members merely by adjusting the position of the work-engaging element 23.

Figure 14:
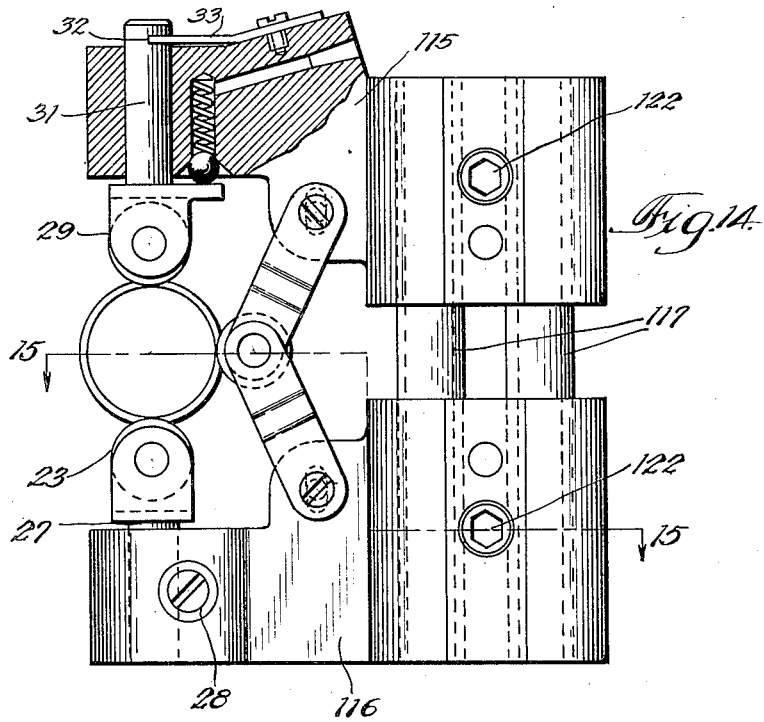
Fig. 14 is a side elevational view of still another gauge embodying the invention.
Figure 15:
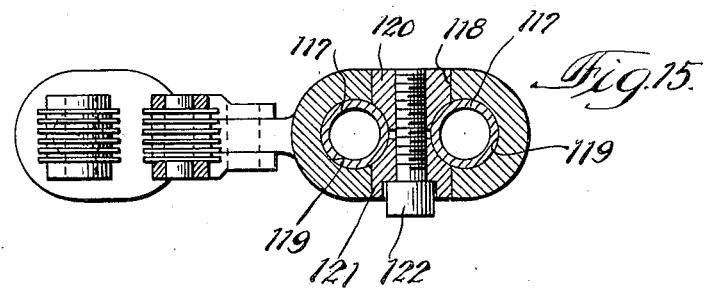
Fig. 15 is a sectional view taken substantially along the line 15—15 of Fig. 14.

In the embodiment of the invention shown in Figs. 14 and 15, the generally C-shaped frame is formed by a pair of frame members 115 and 116 which, instead of being pivotally connected as in the embodiment of Fig. 9, are mounted for relative sliding movement along a pair of supporting pins 117. In order to lock the frame member 116 in adjusted positions on the supporting pins 117, the frame member is provided with a transverse aperture 118 (Fig. 15) which extends through the frame member between and in intersecting relation to the apertures 119 through which the supporting pins 117 extend. Disposed in the transverse aperture 118 is a pair of locking blocks 120 and 121, the inner ends of which are provided with curved surfaces adapted to engage the supporting pins 117. A locking screw 122 is provided which extends through a suitable hole in the block 121 and threadedly engages a correspondingly tapped hole in the block 120. When the locking screw 122 is tightened, the blocks 120 and 121 are drawn toward each other so as to clamp the supporting pins 117 against movement relative to the frame member 116. As indicated in Fig. 14, the frame member 115 is provided with similar locking means for engaging the supporting pins 117. The various locking means 28 shown in each of the other embodiments of the invention are of the same general type as illustrated in Fig. 15, except that they are arranged to engage only one pin instead of a pair of parallel pins as in Fig. 15. It is thought that the construction and operation of the remaining elements in the gauge shown in Figs. 14 and 15 will be clear from the previous description of other embodiments, similar elements being identified by previously used reference numerals.

In using any of the gauges embodying the invention as a comparator, the gauge is first adjusted by inserting a standard workpiece between the work-engaging elements and adjusting the spacing of the elements so as to give a predetermined or normal reading on the pressure-responsive instrument 44. When a workpiece to be checked is thereafter inserted between the work-engaging elements, any variations in diameter from the standard workpiece will cause a corresponding variation in the restriction of the outlet of the fluid passageway, and consequently the gauge 44 will indicate the degree of variation. If desired, the various gauges may be used to measure directly the size of workpieces, in which case the indicator instrument 44 may be calibrated to give a direct reading of the size.

It will be observed that each of the gauges herein described and embodied in the present invention is of sturdy construction and embodies only easily adjustable and readily assembled parts. Consequently a compact and sturdy gauge is provided which accurately responds to small variations in the size of the workpieces being checked, and which is not likely to be damaged or rendered inaccurate through improper usage.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A gauge for checking workpieces of substantially circular contour comprising a pair of frame members connected together for relative movement and shaped to form a substantially C shaped frame, a first work-engaging element mounted on and extending inwardly from one of said frame members, an oppositely disposed work-engaging element mounted on the other of said frame members in spaced relation to said first element, whereby relative movement of said frame members varies the spacing of said work-engaging elements to receive workpieces of different diameters, a pair of links pivotally connected together, a backing member supported on the pivotal connection between said links, and means pivotally connecting the respective opposite ends of said links to said frame members with said links in angular relation to position said backing member rearwardly of said spaced elements for limiting the extent of insertion between said elements of a workpiece being checked, whereby relative movement of said frame members causes relative angular movement of said links to adjust said backing member toward and away from said spaced elements, and means for locking said frame members and links against relative movement to position said backing member in accordance with the spacing of said elements.

2. A gauge for checking workpieces of substantially circular contour comprising a pair of frame members connected together for relative movement and shaped to form a substantially C-shaped frame, a first work-engaging element mounted on and extending inwardly from one of said frame members, an oppositely disposed work-engaging element mounted on the other of said frame members in spaced relation to said first element, whereby relative movement of said frame members varies the spacing of said work-engaging elements to receive workpieces of different diameters, means resiliently mounting one of said elements for limited movement by a workpiece upon insertion between said elments, means responsive to said limited movement of said one element for indicating the size of the workpiece being checked, a pair of links pivotally connected together, a backing member supported on the pivotal connection between said links, and means pivotally connecting the respective opposite ends of said links to said frame members with said links in angular relation to position said backing member rearwardly of said spaced elements for limiting the extent of insertion between said elements of a workpiece being checked, whereby relative movement of said frame members causes relative angular movement of said links to adjust said backing member toward and away from said spaced elements, and means for locking said frame members and links against relative movement to position said backing member in accordance with the spacing of said elements.

FRED W. KUPPERSMITH.

REFERENCES CITED

The following references are of record in the file of this patent:

UNITED STATES PATENTS

| Number | Name | Date |
| --- | --- | --- |
| 1,547,514 | Mueller | July 28, 1925 |
| 1,985,576 | Menesson | Dec. 25, 1934 |
| 2,027,217 | Zerkle | Jan. 7, 1936 |
| 2,306,469 | Rupley | Dec. 29, 1942 |
| 2,341,679 | Wildermuth | Feb. 15, 1944 |
| 2,357,569 | Wright et al. | Sept. 5, 1944 |
| 2,397,494 | Kuppersmith | Apr. 2, 1946 |

FOREIGN PATENTS

| Number | Country | Date |
| --- | --- | --- |
| 341,365 | Great Britain | Jan. 15, 1931 |
| 555,893 | Great Britain | Sept. 10, 1943 |